United States Patent [19]

Miyamoto

[11] Patent Number: 5,764,422
[45] Date of Patent: Jun. 9, 1998

[54] LENS DRIVE DEVICE FOR ZOOM OPTICAL SYSTEM

[75] Inventor: Hidenori Miyamoto, Urayasu, Japan

[73] Assignee: Nikon Corporation, Tokyo, Japan

[21] Appl. No.: 600,061

[22] Filed: Feb. 12, 1996

[30] Foreign Application Priority Data

Apr. 28, 1905 [JP] Japan .................................. 7-106254

[51] Int. Cl.$^6$ .......................................... G02B 15/14
[52] U.S. Cl. ............................ 359/696; 359/697; 359/702
[58] Field of Search ................................. 359/823, 822, 359/696, 697, 698, 705; 354/195.12, 400

[56] References Cited

U.S. PATENT DOCUMENTS

| | | | |
|---|---|---|---|
| 4,583,827 | 4/1986 | Tokunaga | 359/823 |
| 4,950,061 | 8/1990 | Tsurukawa | 359/696 |
| 5,016,993 | 5/1991 | Akitake | 359/696 |
| 5,166,829 | 11/1992 | Iizuka | 359/699 |
| 5,198,932 | 3/1993 | Takamura | 359/694 |
| 5,223,873 | 6/1993 | Tsuboi | 354/199 |
| 5,241,422 | 8/1993 | Shimada | 359/694 |
| 5,270,868 | 12/1993 | Nomura | 359/700 |
| 5,302,991 | 4/1994 | Nakayama | 396/81 |
| 5,323,199 | 6/1994 | Yoshida | 354/195.1 |
| 5,349,476 | 9/1994 | Burnham | 359/699 |

*Primary Examiner*—Georgia Y. Epps
*Assistant Examiner*—Ricky Mack

[57] ABSTRACT

A lens drive device for a zoom optical system drives first and second lenses along an optical axis with a single drive source. A transmission mechanism connects the drive source and the first and second lenses. The transmission mechanism transmits drive to the first lens during a first motion range and to the first and second lenses during a second motion range. A focal length of the optical system changes in the first motion range and a focal point position of the optical system changes in the second motion range. The first and second lenses respectively moves in response to movement of a first and second feed screw. A first gear transmits drive from the drive source to the first feed screw while a second gear intermittently transmits drive from the drive source to the second feed screw. A lock lever interlocks with the second gear in response to rotation of a large diameter section of the first gear to thereby arrest movement of the second gear and second feed screw. A spring urges the lock lever into contact with the second gear.

32 Claims, 8 Drawing Sheets

LENS DRIVE DEVICE FOR ZOOM OPTICAL SYSTEM

BACKGROUND OF THE INVENTION

1. Field of the Invention

The present invention relates to a lens drive device which drives an optical system equipped with multiple lenses. More particularly, the present invention relates to a lens drive device which drives a zoom optical system.

2. Description of the Related Art

A number of conventional devices perform variable power operations and focusing operations in zoom optical systems. For example, Japanese Laid Open Patent Publication No. SHO 60-122931 ("the '931 publication") and Japanese Laid Open Patent Publication No. SHO 61-259210 ("the '210 publication") describe devices which perform the above operations while using a single drive source. In the '931 publication, the focal length is changed by inserting a supplementary optical system into the optical path of the main optical system while varying the focal length of the main optical system. The entire optical system is then driven in the direction of the optical axis to adjust focus for a set focal length.

In the '210 publication two lens groups are installed in a common cam cylinder. The cam cylinder is then set so that a variable power operation and a focusing operation occur in the two lens groups when the cam cylinder is continuously rotated in one direction. The focusing operation aligns the focal plane of the optical system for a desired subject with a specified position. The variable power operation changes the focal length of the optical system.

In the aforementioned conventional devices, because all lens groups are driven during the focusing operation, the required lens drive is large and the required drive time is long. Additionally, a larger lens barrel is required. In the case of the '210 publication, a need for cam cylinder adjustment requires a larger diameter lens barrel. Moreover, change between the variable power range and the focusing range require that a cam groove be changed when a cam is used. Accordingly, the shape of the cam groove becomes complicated thereby increasing manufacturing time and labor.

SUMMARY OF THE INVENTION

It is therefore an object of the present invention to provide lens drive to multiple lenses by using a single drive source.

It is a further object of the invention to quickly perform lens focusing to multiple lenses while achieving lens barrel compactness.

It is a further object of the present invention to impart appropriate motion to multiple lenses from a single lens drive source without relying on a complicated design shape such as a conventional cam groove.

Objects of the invention are achieved by a lens drive device which drives an optical system along an optical axis. The lens drive device includes a first lens which is movable along the optical axis and a second lens which is movable along the optical axis. A drive source which provides drive to the lens drive device while a transmission mechanism, connected to the drive source and the first and second lenses, transmits drive to the first lens during a first motion range and to the first and second lenses during a second motion range.

Objects of the present invention are also achieved by providing a first transmission mechanism which continuously transmits motion from a single drive source to a first lens along an optical axis and by providing a second transmission mechanism which intermittently transmits motion from the single drive source to a second lens along the optical axis.

Moreover, objects of the invention are achieved by providing a first movable lens along an optical axis in response to movement of a first feed screw, a second movable lens along the optical axis in response to movement of a second feed screw, a first gear which transmits drive from a drive source to the first feed screw, and a second gear which intermittently connects to the first gear and which intermittently transmits drive from the drive source to the second feed screw during the intermittent connection.

BRIEF DESCRIPTION OF THE DRAWINGS

These and other objects and advantages of the invention will become apparent and more readily appreciated from the following description of the preferred embodiments, taken in conjunction with the accompanying drawings of which.

DESCRIPTION OF THE PREFERRED EMBODIMENTS

Figure 1:
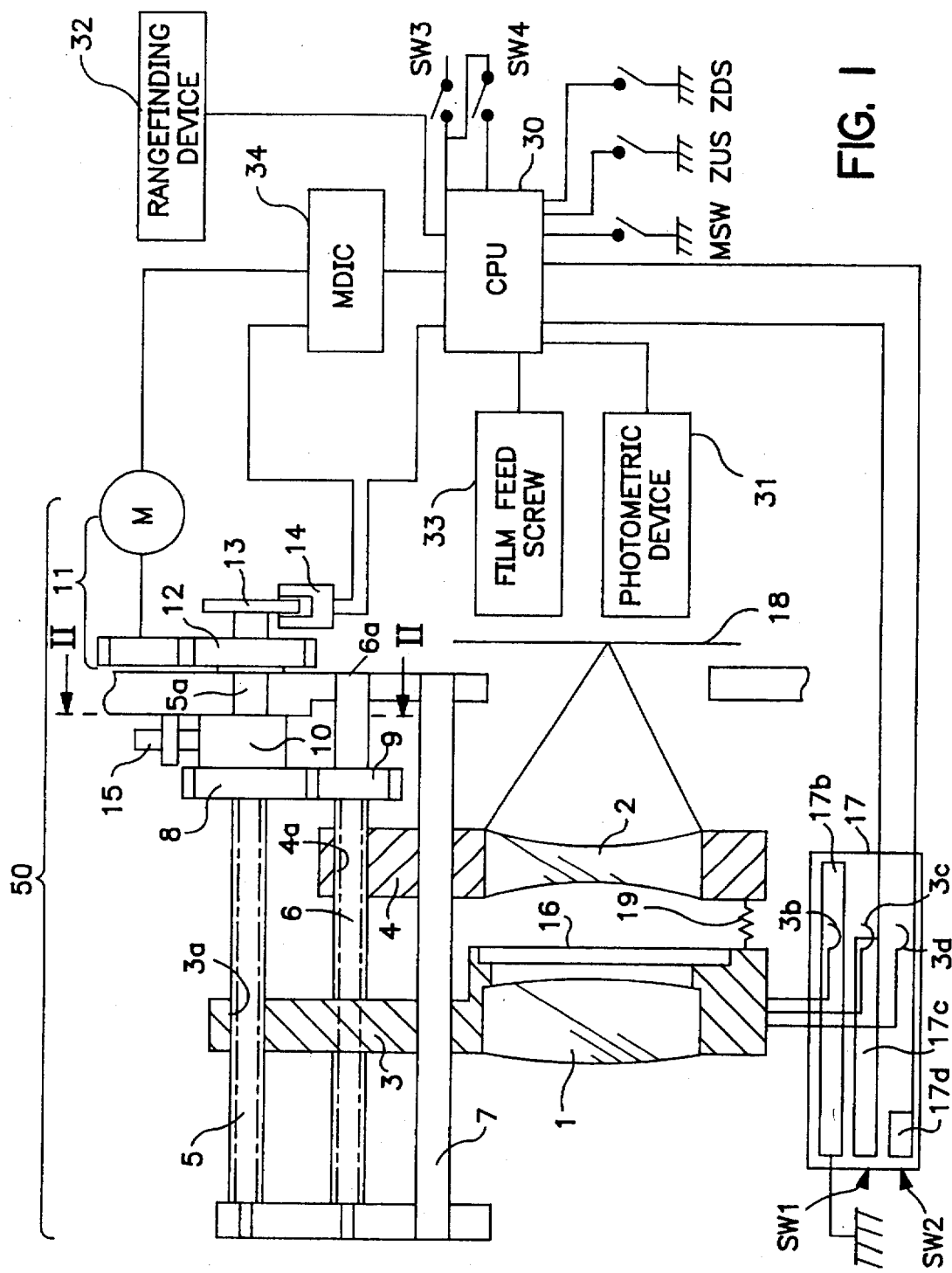
FIG. 1 is a schematic diagram illustrating major components of a camera incorporating the present lens drive device.

Reference will now be made in detail to the preferred embodiments of the present invention, examples of which are illustrated in the accompanying drawings, wherein like reference numerals refer to like elements throughout.

A preferred embodiment of a lens drive device according to the present invention is described below with reference to FIGS. 1–3, wherein the lens drive device is applied to the optical system of a camera.

FIG. 1 illustrates lens drive 50 which is incorporated as part of a number of major camera components. Lens drive 50 includes first lens 1 which is supported by first lens rim 3. Lens drive 50 also includes second lens 2 which is supported by second lens rim 4. First lens 1 and second lens 2 are required to be driven in a direction of an optical axis when the focal length along the optical axis is changed and when the focal point is adjusted, i.e. when the focus is adjusted. First lens 1 is driven independently from second lens 2 in the direction of the optical axis as set forth below.

First lens rim 3 screws into first feed screw 5 by way of female screw 3a. Second lens rim 4 likewise screws into second feed screw 6 by way of female screw 4a. Lenses 1 and 2 respectively move in the direction of the optical axis while being guided by guide shaft 7. Lenses 1 and 2 move in proportion to an amount of rotation of feed screws 5 and 6.

Gears 8 and 9 are aligned in the direction of the optical axis and are respectively attached to support shafts 5a and 6a of feed screws 5 and 6. Lock cam 10, which drives lock lever 15, is also attached to support shaft 5a of first feed screw 5. The details of gears 8 and 9 are described below.

In the present embodiment, lens drive motor M is considered the drive source. Motor M includes an output shaft which transmits rotation to driven gear 12. Driven gear 12 is attached to support shaft 5a by reduction gear train 11.

In order to detect an amount of movement of lenses 1 and 2 in the direction of the optical axis, slit disk 13 is secured to an end of support shaft 5a. Photo-interrupter 14 surrounds slit disk 13 and outputs pulse array signals in proportion to an amount of rotation of slit disk 13. Photo-interrupter 14 is attached in the rotation path of slit disk 13.

Position detection switches SW1 and SW2 are positioned outside of first lens rim 3 in order to specify predetermined positions of lenses 1 and 2 in the direction of the optical axis. Position detection switches SW1 and SW2 are attached to pattern board 17. Pattern board 17 itself is attached as part of lens drive 50 and is separated from first lens rim 3.

Position detection switch SW1 includes conductor patterns 17b and 17c as part of pattern board 17, and flanges 3b and 3c which are respectively attached to first lens rim 3. Flanges 3b and 3c contact conductor patterns 17b and 17c. Pattern board 17 outputs an "H" signal when conductor pattern 17c and flange 3c are separated and outputs an "L" signal when conductor pattern 17c and flange 3c are connected.

Position detection switch SW2 includes conductor patterns 17b and 17d as part of pattern board 17, and flanges 3b and 3d which are attached to first lens rim 3. Switch SW2 outputs an "H" signal when conductor pattern 17d and flange 3d are separated and outputs an "L" signal when conductor pattern 17d and flange 3d are connected. Conductor pattern 17c extends longer than conductor pattern 17d on a side of pattern board 17 facing film plane 18.

As illustrated in FIG. 1, aperture/shutter 16 is secured to first lens rim 3. Energizing member 19 energizes first lens rim 3 and second lens rim 4 in the direction of the optical axis in mutually opposite directions. Energizing member 19 is preferably configured as a coil spring. Through the force of energizing member 19, female screws 3a and 4a are always connected in a fixed direction with respect to feed screws 5 and 6. This prevents feed error due to backlash.

Figure 2:
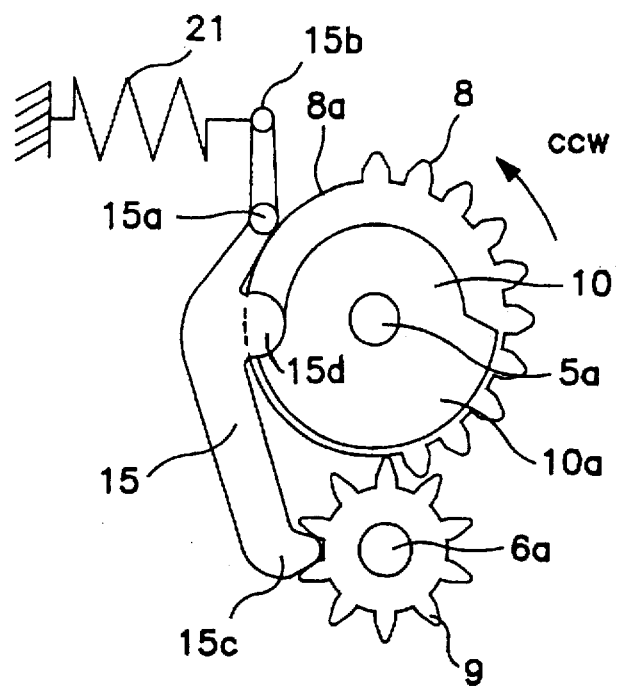
FIG. 2 is a sectional view taken along line II—II of FIG. 1 illustrating gear rotation.
Figure 3:
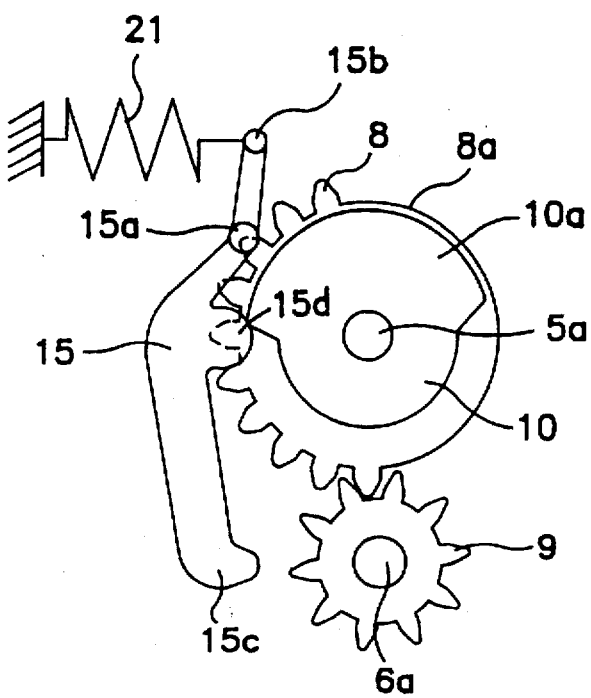
FIG. 3 is another sectional view taken along line II—II of FIG. 1 illustrating gear rotation.

FIGS. 2 and 3 illustrate gears 8 and 9 in greater detail. FIG. 2 illustrates a cross section along line II—II of FIG. 1, while FIG. 3 illustrates the cross section along line II—II of FIG. 1 in a second condition according to rotational positions of gears 8 and 9.

Referring now to FIG. 2, gear 8 is an intermittent transmission gear which includes toothless section 8a. Toothless section 8a does not include teeth and thereby does not mesh with gear 9 during rotation of gear 8. Accordingly, rotation is intermittently transmitted from gear 8 to gear 9. As illustrated in FIG. 2, if first feed screw 5 rotates in the direction of arrow CCW, rotation is not transmitted to gear 9.

Lock lever 15 rotates freely around shaft 15a and is pressed against the outer circumference of lock cam 10 by spring 21. Spring 21 is an energizing member connected to one end 15b of lever 15. Lock cam 10 rotates in unison with second feed screw 6. Large diameter section 10a of lock cam 10 interlocks with gear 9 during part of its rotation.

FIG. 2 illustrates a condition where lock lever extension 15d has escaped from large diameter section 10a such that catch 15c meshes with gear 9. This prevents rotation of second feed screw 6.

FIG. 3 illustrates a condition where lock lever extension 15d contacts large diameter section 10a such that catch 15c is released from gear 9. Lock cam 10 and gear 8 are aligned circumferentially such that when gear 8 and gear 9 mesh, lock lever 15 contacts large diameter section 10a. Further, when toothless section 8a of gear 8 passes a position of meshing with gear 9, lock lever extension 15d escapes from large diameter section 10a and catch 15c contacts gear 9. Therefore, when rotation is not transmitted from gear 8 to gear 9, second feed screw 6 is arrested circumferentially by lock lever 15. Accordingly, positional dislocation of second lens 2 due to vibration is prevented.

Figure 4:
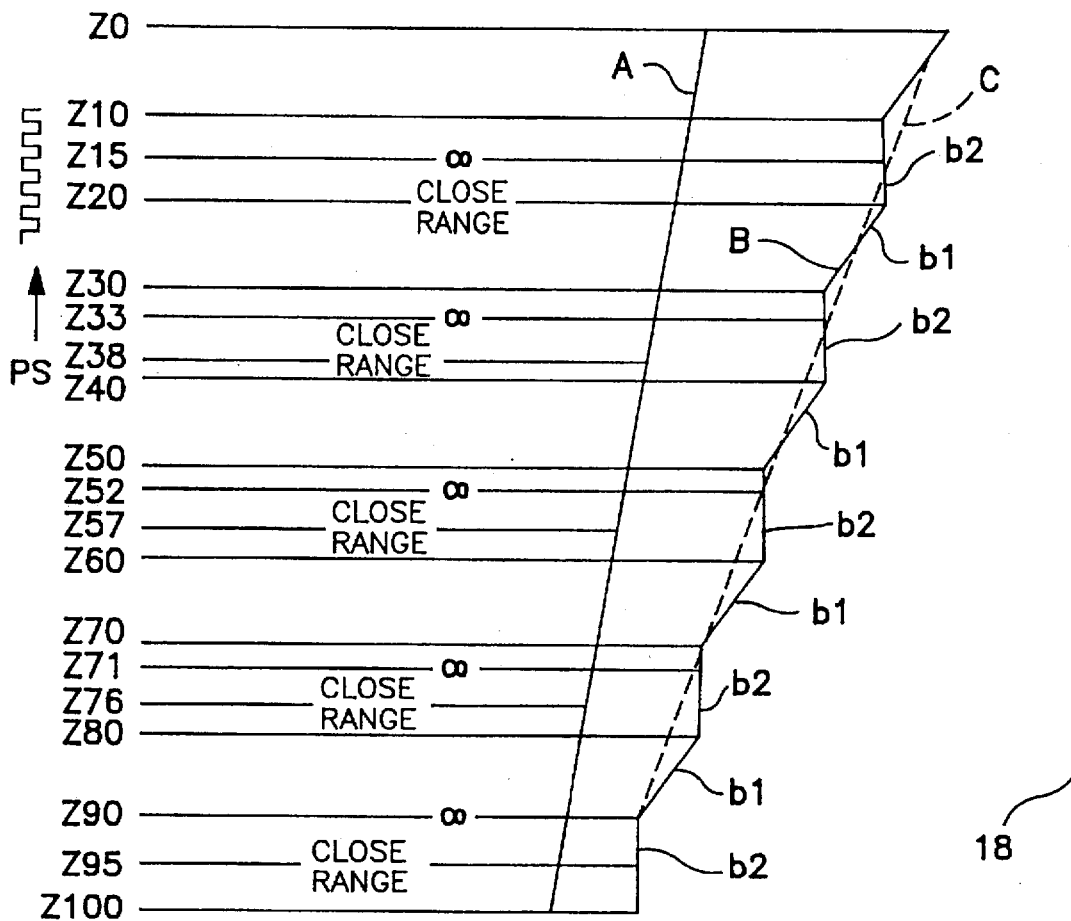
FIG. 4 is a graph which illustrates a relationship between rotation of a first feed screw and corresponding positions of a first and second lens in a direction of an optical axis.

FIG. 4 graphically illustrates a relationship between an amount of rotation of first feed screw 5 and corresponding positions of lenses 1 and 2 in the direction of the optical axis. The vertical axis indicates an amount of rotation of first feed screw 5 and the horizontal axis illustrates the positions of lenses 1 and 2 in the direction of the optical axis. Lenses 1 and 2 separate from film plane 18 in proportion to displacement toward the left side of FIG. 4. Symbol PS, which is adjacent to the vertical axis, graphically illustrates pulse array signals output from photo-interrupter 14.

As illustrated in FIG. 4, the letter Z references a position where the signal from position detection switch SW1 reverses from "H" to "L." Letter Z also represents an amount of rotation of first feed screw 5 when lenses 1 and 2 are driven in a direction such that they become farther from film plane 18, i.e. to the left. The numbers 0–100 following letter Z illustrate an estimated value of output pulses of photo-interrupter 14 from the aforementioned reference position. For example, if the amount of rotation is Z50, first feed screw 5 rotates by 50 pulses from the reference position of Z0 thereby extending lenses 1 and 2 away from film plane 18. The pulse count is output from photo-interrupter 14.

As illustrated in FIG. 4, the motion path of first lens 1 is indicated as solid line A and the motion path of second lens 2 is indicated as solid line B. That is, first lens 1 continually becomes farther from film plane 18 as the amount of rotation Z of first feed screw 5 increases from Z0 to Z100.

Second lens 2 moves in the direction of the optical axis in proportion to the amount of rotation of second feed screw 6. However, because second feed screw 6 only rotates intermittently with respect to the rotation of first feed screw 5 (based on the aforementioned relationship of gears 8 and 9), moving range b1 and stopped range b2 are alternately indicated in motion path B. In other words, each range b1 indicates rotation of feed screw 6 through movement towards the left while each range b2 indicates that feed screw 6 has stopped by not advancing towards the left.

FIG. 4 also illustrates that an incline from the vertical direction of moving range b1 in motion path B is larger than the incline of motion path A. Second lens 2 is in motion during range b1. Thus, the relationship between the leads of first feed screw 5 and second feed screw 6 and the gear ratios of gears 8 and 9 are set so that first lenses 1 moves slightly farther, in the direction of the optical axis, than second lenses 2 per unit rotation of motor M.

In the present embodiment, the relationships between lenses 1 and 2, and lens rims 3 and 4 are set so that the focal length of the optical system changes when second lens 2 is in moving range b1 and the focal point position (focus) changes with respect to a fixed focal length when second lens 2 is in stopped range b2. More specifically, respective lenses 1 and 2 move simultaneously and the focal length changes when the amount of rotation Z of first feed screw 5 is Z20~Z30, Z40~Z50, Z60~Z70 or Z80~Z90. Second lens 2 stops and the focal length is held constant when an amount of rotation Z of second feed screw 6 is Z10~Z20, Z30~Z40, Z50~Z60, Z70~Z80 or Z90~Z100.

First lens 1 moves to an in-focus position with respect to a subject at infinity particularly when an amount of rotation Z is Z15, Z33, Z52, Z71 or Z90 with respect to ranges Z10~Z20, Z30~Z40, Z50~Z60, Z70~Z80 and Z90~Z100. Lens 1 moves to the in-focus position with respect to a subject at a closest range when an amount of rotation Z is Z20, Z38, Z57, Z76 or Z95 with respect to the ranges set forth above.

In other words, the range where the focal length changes (as first feed screw 5 rotates by an amount corresponding to 10 pulses of photo-interrupter 14), and the range where the focal length does not change are alternately indicated. For the ranges where the focal length does not change (stopped range b2 of second lens 2), the ranges Z15~Z20, Z33~38, Z52~Z57, Z71~Z76 and Z90~Z95, which correspond to 5 pulses of the photo-interrupter 14, are ranges in which the focusing operation is performed.

As set forth above, the focusing operation is performed in an area which is limited to a narrower range than stopped range b2 of second lens 2. This ensures that stopped range b2 of second lens 2 is wider than the in-focus range in order to assign the in-focus range to an appropriate position within stopped range b2. This also ensures compensation for the position of first lenses 1 in the optical design.

During the focusing operation, the position of second lens 2 is constant, and the position of first lens 1 with respect to the position of second lens 2 does not become straight. For example, in FIG. 4 the case where the subject distance is at infinity is illustrated by dashed line C.

As illustrated in FIG. 1, the output of position detection switches SW1 and SW2 and the output of photo-interrupter 14 are received by camera CPU 30. Camera CPU 30 is equipped with a microcomputer and performs various computations and sequence controls necessary for photographic operation. Photometric device 31, which measures subject brightness, is connected to CPU 30. A counter device (not shown), which measures the counts output from photo-interrupter 14, is also connected to CPU 30.

Also connected to CPU 30 are: rangefinding device 32 which detects subject distance; film feed screw 33 which feeds the film; MDIC 34 which drives motor M; halfpress switch SW3 which turns ON when a release button (not shown) is depressed halfway; release switch SW4 which turns ON when the release button (not shown) is fully depressed; main switch MSW which turns the power ON and OFF; zoom up switch ZUS which turns ON with the operation of a zoom up button (not shown); and zoom down switch ZDS which turns ON with the operation of a zoom down button (not shown).

In the present embodiment, first lens 1 is driven within a range of 0~5 pulses output by photo-interrupter 14 at all focal lengths to perform focusing. Highly-accurate focusing is possible by increasing the number of slits of the slit disk 13 or making the leads of feed screws 5 and 6 finer. It is also permissible to change the pulse count for focusing according to the focal length. The changed pulse count must not exceed a pulse count which corresponds to stopped ranges b2 of second lens 2.

The pulse count for the present embodiment is 10 pulses. In the present embodiment, the number of stopped ranges b2 of second lens 2 is not limited to 5, as illustrated in FIG. 4, but can be set to any number. Further, the number of lenses is not limited to 2 but can be 3 or more. Alternatively, each lens may be replaced by a lens group.

The combination of gear train 11, driven gear 12, first feed screw 5, first lens rim 3, gears 8 and 9, second feed screw 6 and second lens rim 4 define a transmission mechanism. A first transmission mechanism includes gear train 11, driven gear 12, first feed screw 5, and first lens rim 3, while a second transmission mechanism includes gears 8 and 9, second feed screw 6 and second lens rim 4.

A first feed screw mechanism includes first feed screw 5 and first lens rim 3, wherein first feed screw 5 is a rotating element. Likewise, a second feed screw mechanism includes second feed screw 6 and second lens rim 4, wherein second feed screw 6 is a rotating element. An intermediate transmission mechanism includes gear train 11, driven gear 12 and gears 8 and 9. The combination of lock cam 10, lock lever 15 and spring 21 sets forth an arresting mechanism.

In the present embodiment, rotation is always transmitted to first feed screw 5 by motor M. However, rotation is only transmitted from motor M to feed screw 5 under specific conditions. For example, mechanisms which switch the rotation transmission path may be located between motor M and first feed screw 5 and between lenses 1 and 2 and the drivers of other camera components. Moreover, driving of lenses 1 and 2 and driving of other camera components illustrated in FIG. 1 may be switched according to a rotation direction of motor M.

FIGS. 5–11 illustrate drive control of lenses 1 and 2 by CPU 30. As set forth below, the rotation direction of motor M when lenses 1 and 2 move in a direction away from film plane 18 shall be called normal rotation. When main switch MSW changes from OFF to ON, CPU 30 starts the processing illustrated in FIG. 5.

Figure 5:
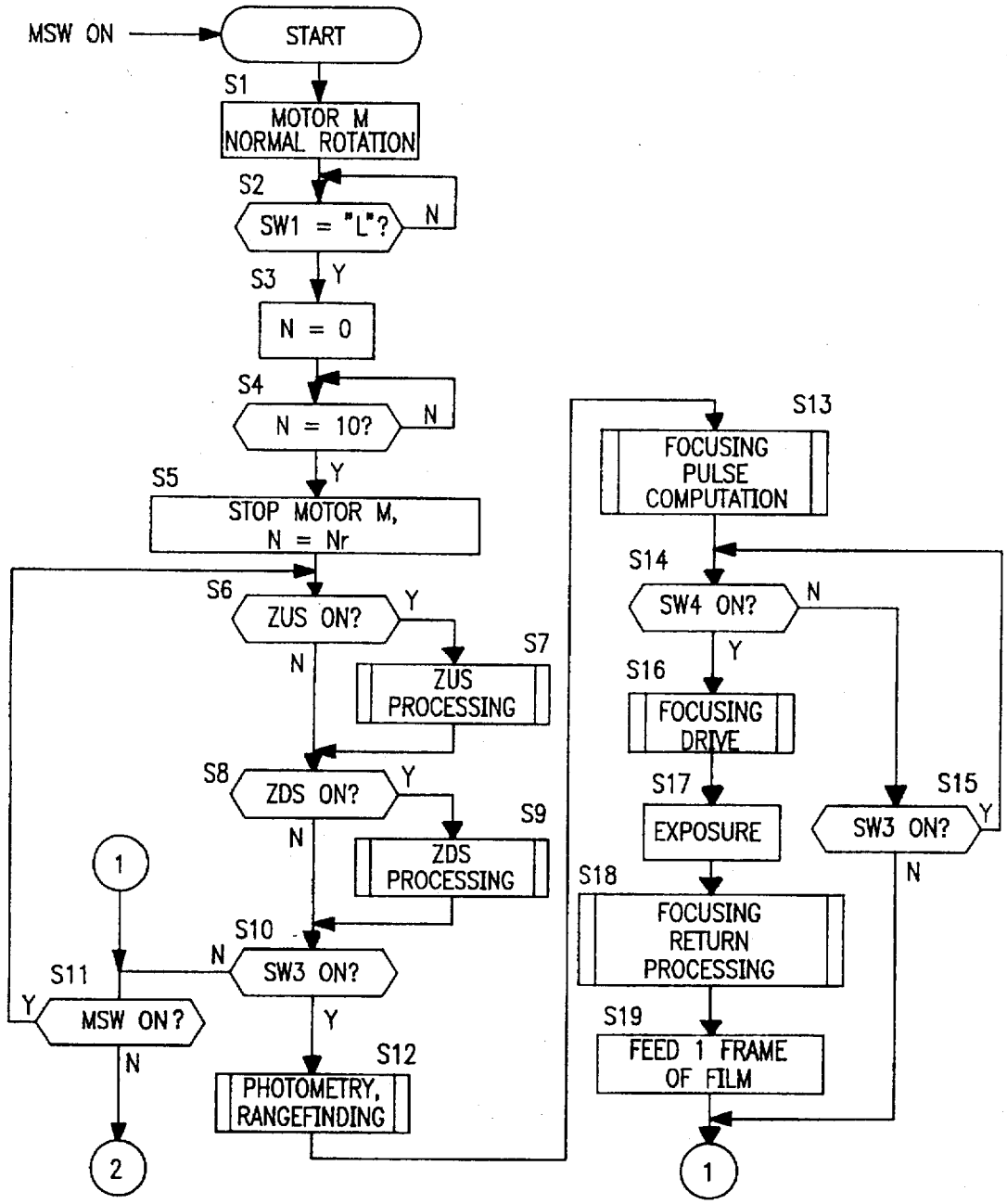
FIG. 5 is a flowchart illustrating a lens drive routine executed by CPU 30 in FIG. 1.

Referring to FIG. 5 and step S1, MSW is turned ON and CPU 30 initiates normal rotation of motor M. In step S2, judgment is made as to whether the output of position detection switch SW1 is an "L" signal. If an "L" signal is not being output, step S2 is repeated. When an "L" signal is output from switch SW1, flow proceeds to step S3 and an estimated value N of the number of pulses of the photo-interrupter 14 (hereafter referred to as the pulse count) is set to 0. In step S4, flow repeats until the pulse count N reaches 10. When the pulse count N reaches 10, flow proceeds to step S5, motor M is stopped, and the pulse count 10 is defined as reference pulse count Nr. At this point, respective lenses 1 and 2 are at positions which correspond to an amount of rotation Z10 in FIG. 4.

In the next step S6, judgment is made as to whether the zoom up switch ZUS is ON. If switch ZUS is ON, zoom up processing (ZUS processing) is executed in step S7, and flow proceeds to step S8. If switch ZUS is OFF, step S7 is omitted and flow proceeds to step S8. In step S8, judgment is made as to whether zoom down switch ZDS is ON. If switch ZDS is ON, zoom down processing (ZDS processing) is executed in step S9, and flow proceeds to step S10. If switch ZDS is OFF, step S9 is omitted and flow proceeds to step S10. Zoom up processing and zoom down processing are discussed below in greater detail.

In step S10, judgment is made as to whether half-press switch SW3 is ON. When half-press switch SW3 is ON, flow proceeds to step S11 and judgment is made as to whether main switch MSW continues to be ON. If main switch MSW is ON, there is a return to step S6.

In step S10, when half-press switch SW3 is ON, flow proceeds to step S12. In step S12, photometry and rangefinding are performed by photometric device 31 and rangefinding device 32, respectively. Next, focusing pulse computation processing is executed in step S13. The details are discussed below.

In step S14, judgment is made whether release switch SW4 is ON. When switch S14 is OFF, flow proceeds to step S15 and judgment is made as to whether half-press switch SW3 is ON. If half-press switch SW3 is ON, there is a return to step S14. If switch SW3 is OFF, there is a return to step S11. When release switch SW4 is ON in step S14, flow proceeds to step S16 and focusing drive processing is executed. After that, flow proceeds to step S17 and aperture/shutter 16 (FIG. 1) is driven based on a photometric value which has been measured in advance. Exposure is also performed. Flow next proceeds to step S18 wherein focusing return processing is performed. In step S19, one frame of film is advanced by film feed device 33, and flow returns to step S11. The details of the processing of steps S16 and S18 will be discussed below.

Figure 6:
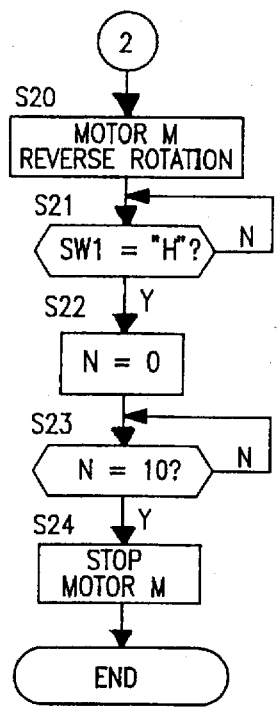
FIG. 6 is a continuation of the flowchart of FIG. 5.

In step S11 when main switch MSW is OFF, flow proceeds to step S20 as illustrated in FIG. 6 and Motor M is set to reverse rotation. Next in step S21, judgment is made as to whether the output of position detection switch SW1 is an "H" signal. If the output of switch SW1 is an "L" signal, step S21 is repeated. When an "H" signal is output from switch SW1, flow proceeds to step S22, and pulse count N is set to an initial value of 0. In step S23, motor M is reversed until pulse count N reaches 10. After that, in step S24, motor M is stopped and processing ends. After processing has stopped, first lenses 1 is at a position which is withdrawn from film plane 18 by an amount corresponding to 10 pulses in terms of the output pulse count of photo-interrupter 14. This is, of course, farther than a position which corresponds to the amount of rotation Z0 in FIG. 4. Second lenses 2 is also at a position which corresponds to rotation amount Z10 in FIG. 4.

Figure 7:
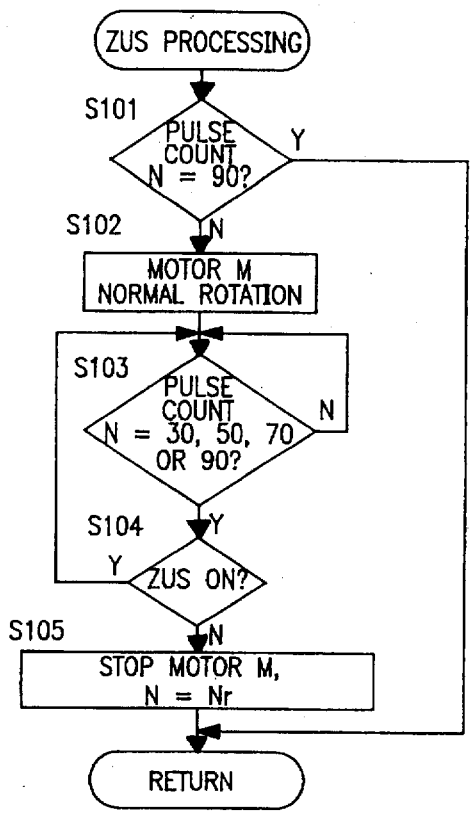
FIG. 7 is a flowchart illustrating zoom up processing (ZUS processing) of FIG. 5.

The zoom up processing (ZUS processing) in step S7 of FIG. 5 is illustrated in more detail in FIG. 7. In step S101 of FIG. 7, judgment is made whether pulse count N is 90. If pulse count N is 90, processing ends. In this instance, further zoom up is not possible because a position has been reached where the output of position detection switch SW1 has reverted to "L." Lenses 1 and 2 have thus moved to a position corresponding to a rotation amount Z90 of FIG. 4. In step S101, when it has been judged that pulse count N is not 90, flow proceeds to step S102 and motor M continues with normal rotation.

In step S103, judgment is made as to whether pulse count N has reached 30, 50, 70 or 90. Step S103 is repeated and motor M continues to rotate until the conditions of S103 are satisfied. After step S103 has been satisfied, flow proceeds to step S104 and judgment is made as to whether zoom up switch ZUS is ON. If switch ZUS is ON, flow returns to step S103. If switch ZUS is OFF, flow proceeds to step S105 and motor M is stopped. At that point, pulse count N is defined as reference pulse count Nr. After the processing of step S105 has ended, flow returns to FIG. 5.

Figure 8:
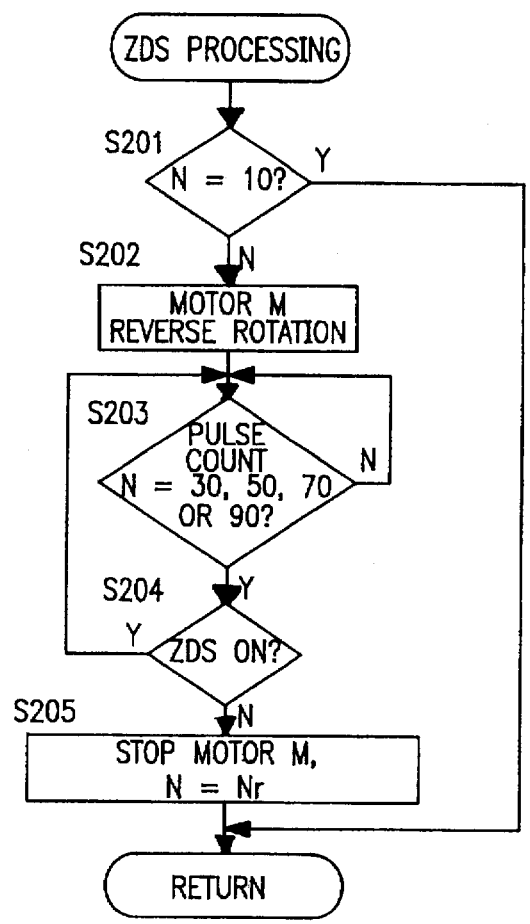
FIG. 8 is a flowchart illustrating zoom down processing (ZDS processing) of FIG. 5.

The details of the zoom down processing in step S9 of FIG. 5 are illustrated in FIG. 8. According to FIG. 8, step S201 judges whether pulse count N is 10. If pulse count N is 10, processing ends. This is because further zoom down is not possible. Zoom down is performed until pulse count N reaches 10, i.e. in a position where the output of position detection switch SW1 has reverted to "L" and lenses 1 and 2 have moved to a position of rotation corresponding to an amount Z10 in FIG. 4. When step S201 judges that pulse count N is not 10, flow proceeds to step S202 and motor M continues with normal rotation.

In step S203, judgment is made whether pulse count N has reached 30, 50, 70 or 90. Step S202 is repeated and motor M continues with reverse rotation until the conditions of step S203 have been satisfied. Upon satisfaction of the conditions of step S203, flow proceeds to step S204 and judgment is made as to whether zoom down switch ZDS is ON. If switch ZDS is ON, flow returns to step S203. If switch ZDS is OFF, flow proceeds to step S205 and motor M is stopped. At this point, pulse count N is defined as the reference pulse count Nr.

After step S205 is complete, flow returns to FIG. 5. According to the processing of FIGS. 7 and 8, i.e. the operation of the zoom up button (not shown) and the zoom down button (not shown), lenses 1 and 2 are driven to positions which correspond to any of rotation amounts Z10, Z30, Z50, Z70 and Z90 of FIG. 4.

Figure 9:
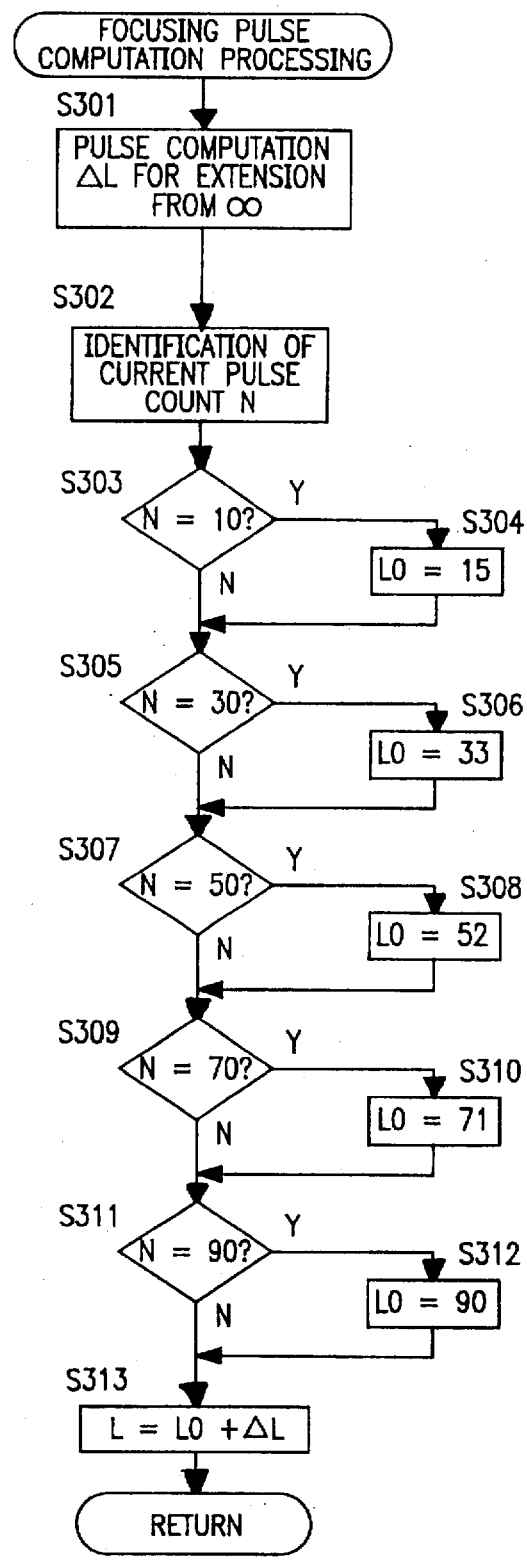
FIG. 9 is a flowchart illustrating focusing pulse computation processing of FIG. 5.

The details of the focusing pulse computation processing in step S13 of FIG. 5 are illustrated in FIG. 9. First, in step S301 of FIG. 8, first lens 1 extension pulse count "L" corresponding to the rangefinding value obtained in step S12 of FIG. 5 is computed. That is, in FIG. 4, when first lens 1 is extended in the range of 0-5 pulses from the in-focus position (a position which corresponds to rotation amounts Z15, Z33, Z52, Z71 or Z90) of first lens 1 with respect to a subject at infinity, computation is made as to whether first lens 1 has come as close as possible to the in-focus position with respect to the rangefinding value obtained in step S12 in FIG. 5.

In the next step S302, the current pulse count N (which becomes 10, 30, 50, 70 or 90 according to the processing of FIGS. 6 and 7) is identified. Next, in steps S303, S305, S307, S309 and S311, judgments are made sequentially as to whether pulse count N is 10, 30, 50, 70 or 90. When pulse count N is 10 in step S304, focusing pulse count L0 (hereunder referred to as the infinity pulse count) is set to 15. In step S306, when pulse count N is 30, infinity pulse count L0 is set to 33. In step S308, when pulse count N is 50, infinity pulse count L0 is set to 52. Likewise in step S310 when pulse count N is 70, infinity pulse count L0 is set to 71, and in step S312 when pulse count N is 90, infinity pulse count L0 is also set to 90.

Next, in step S313, the pulse count corresponding to infinity L0 and the extension pulse count ΔL are added to obtain focusing pulse count L. After that, there is a return to the processing in FIG. 5. Focusing pulse count L is equivalent to a conversion of the rotation amount of first feed screw 5 (needed to drive first lens 1 at Z0 in FIG. 4 to the infocus position) into a pulse count of photo-interrupter 14.

Figure 10:
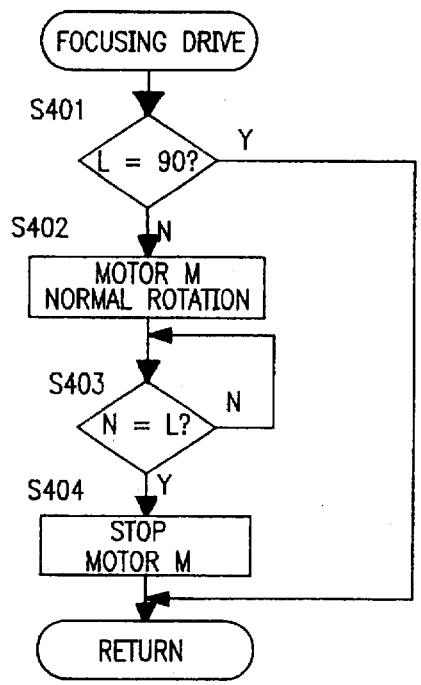
FIG. 10 is a flowchart illustrating focusing drive processing of FIG. 5.

The details of the focusing drive processing of step S16 of FIG. 5 are illustrated in FIG. 10. First, in step S401 of FIG. 10, judgment is made as to whether focusing pulse count L obtained in the processing of FIG. 9 is 90. If L=90, processing is ends. In such a case, first lens 1 has already moved to the position of rotation amount Z90 in FIG. 4, and further driving of first lens 1 is not necessary. In step S401, when focusing pulse count L is not 90, flow proceeds to step S402 and motor M is rotated normally.

Next, in step S403, judgment is made as to whether pulse count N matches focusing pulse count L, and that judgment is repeated until a match occurs. When the pulse count N matches focusing pulse count L, flow proceeds to step S404 and motor M is stopped. Accordingly, first lens 1 stops at an in-focus position which corresponds to a measured value obtained in step S12 of FIG. 5.

Figure 11:
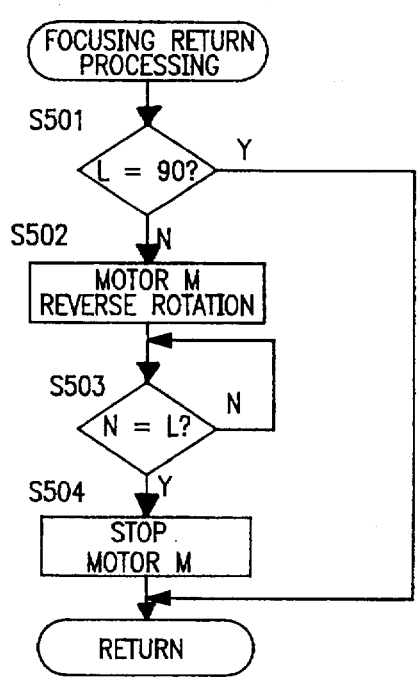
FIG. 11 is a flowchart illustrating focusing return processing of FIG. 5.

The details of the focusing return processing of step S18 in FIG. 5 are illustrated in FIG. 11. In step S501 of FIG. 11, judgment is made as to whether focusing pulse count L obtained in the processing of FIG. 9 is 90. If L=90, processing ends. This is because first lens 1 is not being driven when focusing pulse count L=90 in the processing of FIG. 10. When focusing pulse count L is not 90 in step S501, reverse rotation of motor M is caused in step S502.

Next, step S503 judges whether pulse count N matches reference pulse count Nr defined either in step S5 of FIG. 5, step S105 of FIG. 7 or step S205 of FIG. 8. This judgment is repeated until a match occurs. When the pulse count N matches reference pulse count Nr, flow proceeds to step S504 and motor M is stopped. Through this, first lens 1 stops at a position which corresponds to any of rotation amounts Z10, Z30, Z50, Z70 or Z90 in FIG. 4.

Although a few preferred embodiments of the present invention have been illustrated and described, it would be appreciated by those skilled in the art that changes may be made in these embodiments without departing from the principles and spirit of the invention, the scope of which is defined in the claims and their equivalents.

What is claimed is:

1. A lens drive device which drives multiple lenses along an optical axis comprising:
   a single drive source;
   a first lens movable along an optical axis;
   a first transmission mechanism which continuously transmits motion from the single drive source to the first lens along the optical axis;
   a second lens movable along the optical axis;
   a second transmission mechanism which intermittently transmits motion from the single drive source to the second lens along the optical axis.

2. The lens drive device according to claim 1, wherein the optical system has a focal length and a focal point position;
   the focal length of the optical system changes when the first and second lenses are respectively driven by the first transmission mechanism and the second transmission mechanism; and
   the focal point position of the optical system changes when the first lens is driven during interruption of the second lens.

3. The lens drive device according to claim 2, wherein:
   during movement of the first and second lenses, the second lens moves at a greater rate of movement than a rate of movement of the first lens.

4. The lens drive device according to claim 3, wherein:
   during interruption of the second lens, the first lens is continually driven at said rate of movement.

5. The lens drive device according to claim 1, wherein:
   the first transmission mechanism comprises a first feed screw that converts drive from the drive source into motion of the first lens in the direction of the optical axis; and
   the second transmission mechanism comprises a second feed screw that converts drive from the drive source into motion of the second lens in the direction of the optical axis.

6. The lens drive device according to claim 5, wherein:
   the first lens moves farther in the optical axis direction than the second lens per unit rotation of the drive source when drive is transmitted to both the first feed screw and the second feed screw.

7. The lens drive device according to claim 5, further comprising:
   an arresting mechanism which arrests rotation of the second feed screw during interruption of the second feed screw.

8. The lens drive device according to claim 5, wherein:
   the first transmission mechanism comprises a first gear having an outer periphery and teeth disposed about a portion of the outer periphery; and
   the second transmission mechanism comprises a second gear having teeth which mesh with the portion of teeth of said first gear during transmission of motion from the single drive source to the second lens.

9. The lens drive device according to claim 8, wherein the teeth of said second gear do not mesh with the teeth of said first gear during interruption of motion from the single drive source to the second lens.

10. A lens drive device which drives an optical system along an optical axis comprising:
    a first feed screw;
    a second feed screw;
    a first lens movable along the optical axis in response to movement of the first feed screw;
    a second lens movable along the optical axis in response to movement of the second feed screw;
    a drive source which provides drive to the lens drive device;
    a first gear which transmits drive from the drive source to the first feed screw; and
    a second gear which intermittently connects to the first gear and transmits drive from the drive source to the second feed screw during the intermittent connection.

11. The lens drive device according to claim 10, further comprising:
    a first lens rim which transfers movement from the first feed screw to the first lens; and
    a second lens rim which transfers movement from the second feed screw to the second lens.

12. The lens drive device according to claim 10, wherein said optical system is disposed within a camera having a film plane, said lens drive device further comprising:
    a shutter secured to the first lens rim and movable in response to the first feed screw wherein the shutter transfers light to the film plane.

13. The lens drive device according to claim 10, further comprising:
    an energizing member disposed between the first lens rim and the second lens rim and supplying a separating force therebetween such that the first and second lens rims maintain a fixed direction with respect to the first and second feed screws.

14. The lens drive device according to claim 10, wherein the first gear further comprises a rotatable large diameter section, and wherein said lens drive device further comprising:
    a lock lever having a catch wherein said lock lever freely rotates around a lever shaft and said catch interlocks with the second gear; and
    an energizing member which urges the catch of said lock lever into contact with the second gear.

15. The lens drive device according to claim 14, wherein the lock lever further comprises:

an extension which contacts said large diameter section and moves the catch out of contact with said second gear.

16. The lens drive device according to claim 10, further comprising:
a slit disk which rotates in proportion to said first feed screw and thereby detects movement of the first lens in the direction of the optical axis; and
a photo-interrupter which surrounds said slit disk and outputs pulse signals in proportion to an amount of rotation of the slit disk.

17. The lens drive device according to claim 16, wherein said drive source drives the first feed screw in response to the pulse signals output from said photo-interrupter.

18. The lens drive device according to claim 10, further comprising:
a position detection switch which detects when the first lens has moved a predetermined distance.

19. A lens drive device which drives multiple lenses along an optical axis of an optical system, wherein the optical system has a focal length and a focal point, comprising:
a single drive source;
a first lens movable along the optical axis;
a first transmission mechanism which continuously transmits motion from the single drive source to the first lens along the optical axis;
a second lens movable along the optical axis; and
a second transmission mechanism which intermittently transmits motion from the single drive source to the second lens along the optical axis;
wherein the focal length of the optical system changes when the first and second lenses are respectively driven by the first transmission mechanism and the second transmission mechanism, and the focal point position of the optical system changes when the first lens is driven during interruption of the second lens.

20. The lens drive device according to claim 19, wherein:
during movement of the first and second lenses, the second lens moves at a greater rate of movement than a rate of movement of the first lens.

21. The lens drive device according to claim 20, wherein:
during interruption of the second lens, the first lens is continually driven at said rate of movement.

22. A lens drive device which drives multiple lenses along an optical axis comprising:
a single drive source;
a first lens movable along the optical axis;
a first transmission mechanism which continuously transmits motion from the single drive source to the first lens along the optical axis;
a second lens movable along the optical axis; and
a second transmission mechanism which intermittently transmits motion from the single drive source to the second lens along the optical axis;
wherein the first transmission mechanism comprises a first feed screw that converts drive from the drive source into motion of the first lens in the direction of the optical axis, and the second transmission mechanism comprises a second feed screw that converts drive from the drive source into motion of the second lens in the direction of the optical axis; and
wherein the first lens moves farther in the optical axis direction than the second lens per unit rotation of the drive source when drive is transmitted to both the first feed screw and the second feed screw.

23. A lens drive device which drives multiple lenses along an optical axis comprising:
a single drive source;
a first lens movable along the optical axis;
a first transmission mechanism which continuously transmits motion from the single drive source to the first lens along the optical, axis;
a second lens movable along the optical axis;
a second transmission mechanism which intermittently transmits motion from the single drive source to the second lens along the optical axis; and
an arresting mechanism which arrests rotation of the second feed screw during interruption of the second feed screw;
wherein the first transmission mechanism comprises a first feed screw that converts drive from the drive source into motion of the first lens in the direction of the optical axis, and the second transmission mechanism comprises a second feed screw that converts drive from the drive source into motion of the second lens in the direction of the optical axis.

24. A lens drive device which drives multiple lenses along an optical axis comprising:
a single drive source;
a first lens movable along the optical axis;
a first transmission mechanism which continuously transmits motion from the single drive source to the first lens along the optical axis;
a second lens movable along the optical axis; and
a second transmission mechanism which intermittently transmits motion from the single drive source to the second lens along the optical axis;
wherein the first transmission mechanism comprises a first feed screw that converts drive from the drive source into motion of the first lens in the direction of the optical axis, and a first gear having an outer periphery and teeth disposed about a portion of the outer periphery; and
wherein the second transmission mechanism comprises a second feed screw that converts drive from the drive source into motion of the second lens in the direction of the optical axis, and a second gear having teeth which mesh with the portion of teeth of said first gear during transmission of motion from the single drive source to the second lens.

25. The lens drive device according to claim 24, wherein the teeth of said second gear do not mesh with the teeth of said first gear during interruption of motion from the single drive source to the second lens.

26. A lens drive device which drives a camera optical system along an optical axis and with respect to a camera film plane, comprising:
a first feed screw;
a second feed screw;
a first lens movable along the optical axis in response to movement of the first feed screw;
a second lens movable along the optical axis in response to movement of the second feed screw;
a drive source which provides drive;
a first gear which transmits drive from the drive source to the first feed screw;
a second gear which intermittently connects to the first gear and transmits drive from the drive source to the second feed screw during the intermittent connection; and a shutter secured to the first lens rim and movable in response to the first feed screw wherein the shutter transfers light to the film plane.

27. A lens drive device which drives an optical system along an optical axis comprising:

a first feed screw;

a second feed screw;

a first lens having a rim and movable along the optical axis in response to movement of the first feed screw;

a second lens having a rim and movable along the optical axis in response to movement of the second feed screw;

a drive source which provides drive;

a first gear which transmits drive from the drive source to the first feed screw;

a second gear which intermittently connects to the first gear and transmits drive from the drive source to the second feed screw during the intermittent connection; and an energizing member disposed between the first lens rim and the second lens rim and supplying a separating force therebetween such that the first and second lens rims maintain a fixed direction with respect to the first and second feed screws.

28. A lens drive device which drives an optical system along an optical axis comprising:

a first feed screw;

a second feed screw;

a first lens movable along the optical axis in response to movement of the first feed screw;

a second lens movable along the optical axis in response to movement of the second feed screw;

a drive source which provides drive;

a first gear which transmits drive from the drive source to the first feed screw, said first gear having a rotatable large diameter section;

a second gear which intermittently connects to the first gear and transmits drive from the drive source to the second feed screw during the intermittent connection;

a lock lever having a catch wherein said lock lever freely rotates around a lever shaft and said catch interlocks with the second gear; and an energizing member which urges the catch of said lock lever into contact with said second gear.

29. The lens drive device according to claim 28, wherein the lock lever further comprises:

an extension which contacts said large diameter section and moves the catch out of contact with said second gear.

30. A lens drive device which drives an optical system along an optical axis comprising:

a first feed screw;

a second feed screw;

a first lens movable along the optical axis in response to movement of the first feed screw;

a second lens movable along the optical axis in response to movement of the second feed screw;

a drive source which provides drive;

a first gear which transmits drive from the drive source to the first feed screw;

a second gear which intermittently connects to the first gear and transmits drive from the drive source to the second feed screw during the intermittent connection;

a slit disk which rotates in proportion to said first feed screw and thereby detects movement of the first lens in the direction of the optical axis; and a photo-interrupter which surrounds said slit disk and outputs pulse signals in proportion to an amount of rotation of said slit disk.

31. The lens drive device according to claim 30, wherein said drive source drives the first feed screw in response to the pulse signals output from said photo-interrupter.

32. A device, comprising:

spring separated first and second lenses;

a first gear connecting a drive to said first lens; and a second gear intermittently connecting said first gear to said second lens.

* * * * *

UNITED STATES PATENT AND TRADEMARK OFFICE
CERTIFICATE OF CORRECTION

PATENT NO.   : 5,764,422
DATED        : June 9, 1998
INVENTOR(S)  : Hidenori Miyamoto It is certified that error appears in the above-identified patent and that said Letters Patent is hereby corrected as shown below:

Title Page,  [30] Foreign Application Priority Data, change "April 28, 1905 Japan 7-106254" to --April 28, 1995 Japan 7-106254--.

Signed and Sealed this

Twenty-second Day of September, 1998

Attest:

BRUCE LEHMAN

*Attesting Officer*     *Commissioner of Patents and Trademarks*